US012503889B2

(12) United States Patent
Wilke et al.

(10) Patent No.: US 12,503,889 B2
(45) Date of Patent: Dec. 23, 2025

(54) ACTUATING MECHANISM FOR ACTUATING VEHICLE DOORS

(71) Applicant: Illinois Tool Works Inc., Glenview, IL (US)

(72) Inventors: Zsolt Wilke, Bad Mergentheim (DE); Andreas Rudolf, Eibelstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 127 days.

(21) Appl. No.: 18/123,033

(22) Filed: Mar. 17, 2023

(65) Prior Publication Data

US 2023/0313584 A1 Oct. 5, 2023

(30) Foreign Application Priority Data

Mar. 30, 2022 (DE) ..................... 10 2022 107 579.6

(51) Int. Cl.
*E05B 81/90* (2014.01)

(52) U.S. Cl.
CPC ........... *E05B 81/90* (2013.01); *E05Y 2400/81* (2013.01)

(58) Field of Classification Search
CPC ....................................................... E05B 81/90
See application file for complete search history.

(56) References Cited

U.S. PATENT DOCUMENTS 6,048,001 A * 4/2000 Miller ....................... E05C 3/24 292/220
8,480,155 B2 * 7/2013 Rauscher .............. E05C 17/203 296/146.4
8,974,641 B2 * 3/2015 Weber .................... B65D 43/26 292/216
11,692,376 B2 * 7/2023 Jeong ...................... E05B 79/22 292/201
11,788,321 B2 * 10/2023 Hashemi ................. E05B 65/46 292/201

(Continued)

FOREIGN PATENT DOCUMENTS

DE 102013112706 5/2015
DE 102018222304 6/2020

(Continued)

OTHER PUBLICATIONS

Examination report dated Feb. 27, 2023 in German application No. 10 2022 107 579.6, (7 pages).

*Primary Examiner* — Mark A Williams
(74) *Attorney, Agent, or Firm* — McAndrews, Held & Malloy, Ltd.

(57) ABSTRACT

The present disclosure relates to an actuating mechanism for actuating, in particular opening, vehicle doors, wherein the actuating mechanism comprises the following: an actuating element, which is transfer-able from a home position into an actuating position in order to generate an electrical actuation signal and into a second actuating position for manual actuation of the vehicle doors; a first flat spring, which is connected to the actuating element in such a way that the first flat spring generates haptic and/or acoustic feedback when the actuating element is transferred into the first actuating position and that the first flat spring preferably biases the actuating element into the home position; and a second spring, in particular a second flat spring, which is connected to the actuating element.

20 Claims, 10 Drawing Sheets

(56) References Cited

U.S. PATENT DOCUMENTS

| | | | | |
|---|---|---|---|---|
| 2008/0136195 | A1* | 6/2008 | Ooe | E05B 83/40 292/198 |
| 2010/0077810 | A1* | 4/2010 | De Franceschi | G01G 15/00 70/283.1 |
| 2012/0153641 | A1* | 6/2012 | Watanabe | E05B 81/14 292/98 |
| 2012/0174692 | A1* | 7/2012 | Haida | E05B 81/25 74/108 |
| 2015/0123408 | A1* | 5/2015 | Longo | E05B 83/30 292/137 |
| 2015/0145265 | A1* | 5/2015 | Weinerman | E05B 81/28 292/199 |
| 2015/0225886 | A1* | 8/2015 | Rocchitelli | E05C 19/00 292/38 |
| 2023/0119079 | A1* | 4/2023 | Dirnberger | E05C 3/24 70/278.7 |

FOREIGN PATENT DOCUMENTS

| | | |
|---|---|---|
| DE | 102020209655 | 2/2022 |
| EP | 3103946 | 12/2016 |
| WO | 2017070307 | 4/2017 |

* cited by examiner

100

100

ACTUATING MECHANISM FOR ACTUATING VEHICLE DOORS

RELATED APPLICATIONS

The present application claims the benefit of German Patent Application No. 10 2022 107 579.6, filed Mar. 30, 2022, titled "Actuating Mechanism for Actuating Vehicle Doors," the contents of which are hereby incorporated by reference.

BACKGROUND

In the automotive industry, doors and flaps are increasingly no longer only opened or closed manually, i.e., mechanically. Rather, the opening or closing movements are performed more frequently automatically, in particular electrically. For example, an electric motor is used here, which, when desired, drives a mechanism for opening or closing the doors and flaps. In order to generate a signal for opening or closing to such electric drives or the associated control devices, a switch can be provided, which generates the desired signal by an actuation of the user. Such switches can be configured as push-buttons, which, when pressed in by the user, generate the aforementioned signal.

In order to not be reliant on the opening or closing of the doors by the electric drive, it is known to provide a mechanical (manual) emergency release. This allows the user to open or close the doors or flaps manually. Such mechanical actuators, such as conventional interior or exterior door handles, are often provided separately from the push-buttons configured as signal transmitters. Not only does this require additional design space for the mechanical variant, but it also results in a non-uniform overall image in which modern electrical push-buttons are connected to traditional mechanical levers.

For the above-mentioned reasons, the problem addressed by the present disclosure is to specify an actuating mechanism for actuating vehicle doors, which enables an electrical as well as manual actuating function and can be arranged even in the smallest possible space.

SUMMARY

The present disclosure relates to an actuating mechanism for actuating vehicle doors, in particular for opening vehicle doors, substantially as illustrated by and described in connection with at least one of the figures, as set forth more completely in the claims. More specifically, the present disclosure further relates to a vehicle having an actuating mechanism for actuating vehicle doors.

In one example, the disclosure relates to an actuating mechanism for actuating, in particular opening or closing, vehicle doors, wherein the actuating mechanism comprises the following: an actuating means, which is transferable from a home position into an actuating position in order to generate an electrical actuation signal and into a second actuating position for manual actuation of the vehicle doors, a first flat spring, which is connected to the actuating means in such a way that the first flat spring generates haptic and/or acoustic feedback when the actuating means is transferred into the first actuating position and that the first flat spring preferably biases the actuating means into the home position; and a second spring, in particular a second flat spring, which is connected to the actuating means.

The flat springs are used not only to bias the actuating means (e.g., actuation button) into its home position. Rather, they simultaneously serve as a feedback mechanism for communicating to the user whether the first actuation variant (e.g., electrical) is activated. Further, by using flat springs, the required design space is effectively reduced.

According to a further embodiment, the second spring is connected to the first flat spring in such a way that the second spring positions the first flat spring in a first resting position, and in particular holds it there, by forming a stop for the first flat spring when the actuating means is transferred from the home position into the first actuating position, and that the second spring permits a further movement of the actuating means from the first actuating position into an intermediate position, in particular for activating a mechanism for transferring the actuating means into the second actuating position, through deformation of the second spring. The second spring thus also has a dual function, which can further reduce the design space.

According to a further embodiment, the second spring is connected to the actuating means in such a way that the second spring biases the actuating means into the home position and/or generates haptic and/or acoustic feedback when the actuating means is transferred into the intermediate position. Accordingly, the second spring has yet a third function for generating feedback to the user.

According to a further embodiment of the present disclosure, the second spring is in particular a flat spring, wherein the two springs are arranged in series opposite the actuating means. In other words, the two springs are arranged one behind the other so that a pressing of the actuating means (e.g., push-button) initially leads to the actuation of the first spring. Only after actuation of the first flat spring is the second spring involved, so that the dual function of the present actuation mechanism is easily facilitated in a confined space.

According to a further embodiment, the actuating means is arranged in such a way with respect to the springs that a resetting force of the first flat spring must be overcome in order to transfer into the first actuating position and that a resetting force of the first and second springs must be overcome in order to transfer into the second actuating position. In other words, it can be provided that the first actuating position can be achievable for generating an electrical signal by a lighter pressure than is the case for achieving the second actuating position. Accordingly, in normal operation, it is easy for the user to achieve the first actuating position in which electrical actuation takes place. Only in the event of a failure of the electric drive can the user push more strongly against the actuating means, in order to also deform the second spring and thus allow a manual actuation.

According to a further embodiment, the actuating means is arranged in such a way with respect to the springs that a higher force is required in order to transfer into the second actuating position than is required in order to transfer into the first actuating position.

According to a further embodiment, the first flat spring has a lower resetting force than the second spring. This embodiment is a particularly straightforward manner of generating different haptic feedback for the user. In other words, according to this embodiment, it is harder to deform the second spring than is the case with the first flat spring. An alternative way to achieve such a force gradation would be to activate the springs with different lever lengths, as will be described in greater detail later on.

According to a further embodiment, the second spring comprises two side-by-side leaf springs. The two leaf springs can be connected flush to one another and can thus increase the resetting force of the second spring. In this embodiment, for example, the first flat spring can comprise a single spring blade, such that the resetting force of the second spring is substantially twice as high as the first leaf spring.

According to a further embodiment, the first and/or the second spring is configured as a snap spring. According to this embodiment, the springs can be used simultaneously in order to provide haptic as well as acoustic feedback to the user. The snap springs, also known as snap frogs, generate an audible snap tone upon deformation, which can be interpreted by the user as feedback that the operation positions have been achieved.

According to a further embodiment, the actuating mechanism comprises a push-push element, which is configured in order to transfer actuating means into the second actuating position. This design variant allows for a semi-automatic transfer of the actuating means to the second, manual actuating position. For example, the push-push element can be used in order to expel the actuating means in order to facilitate a grasping of the actuating means in the second actuating position. The push-push element further has the advantage that the actuating means can be configured particularly small and comprises a hidden second operation option.

According to a further embodiment, the actuating means is pivotally fastened to a pivot axis in such a way that the actuating means is movable relative to the first flat spring. By the pivotable movement of the actuating means, a transmission of force for activating the signal generator or for manually opening the door can be simplified by a levering effect. This is particularly helpful with emergency releases configured as Bowden cables.

According to a further embodiment, the first flat spring is fastened to a pivot arm, which is pivotally fastened to the pivot axis. Accordingly, not only the actuating means but also the first flat spring can be pivoted relative to the pivot axis. This allows the actuating means to pivot even further after the first flat spring has deformed, in particular together with the pivot arm. Accordingly, the first flat spring is not an end stop, but can be pivoted together with the actuating means after actuation of the signal generator, as will be explained in greater detail later on.

According to a further embodiment, in the home position and in the first actuating position of the actuating means, the pivot arm abuts the second spring without deforming the second spring. Accordingly, in the home position and the first actuating position of the actuating means, the pivot arm represents a stable bracket for the first flat spring. Only upon transfer into the second actuating position is the second spring deformed by the pivot arm so that the pivot arm moves together with the actuating means towards the second spring. Accordingly, the second spring can be used as a biasing spring for the pivot arm as well as the actuating means.

In a further aspect, the present disclosure relates to a vehicle having an actuation mechanism as described above.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
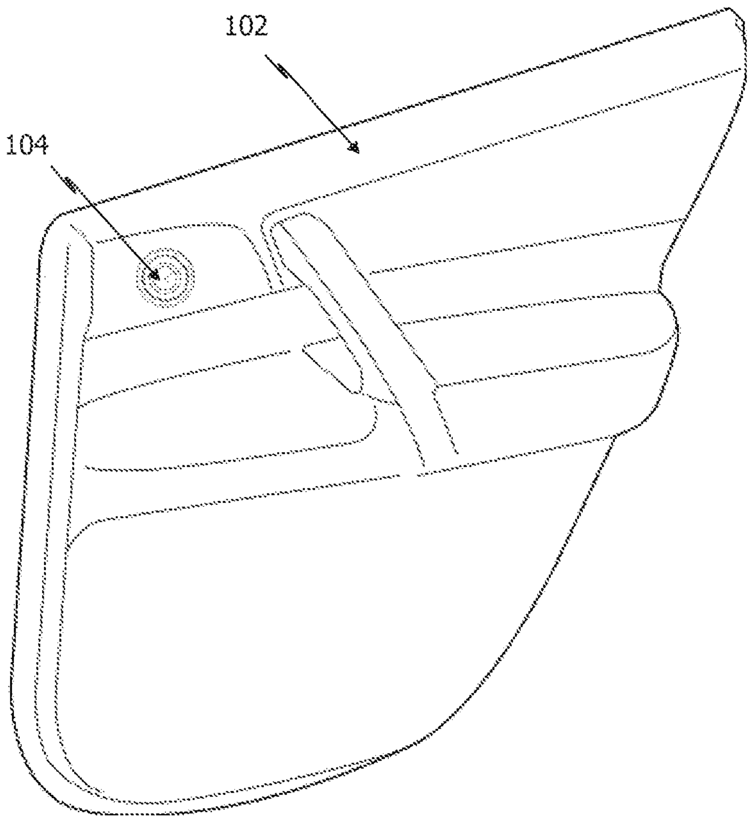
FIG. 1 is schematic view of an interior door having an actuating mechanism according to an embodiment of the present disclosure.

FIG. 1 shows a schematic view of an interior vehicle door 102 with an actuating mechanism for actuating, in particular opening, the vehicle door. In particular, the actuating mechanism shown schematically herein is provided in order to fulfill two opening functions: on the one hand, the actuating mechanism allows the vehicle door to be electrically opened. For this purpose, the actuating mechanism comprises an actuating means 104, which, for example, can be an actuating element that can be pushed in by the user towards the vehicle door in order to activate an electric drive. On the other hand, the actuating mechanism can be used in order to manually, that is, mechanically, open the door, as will be discussed in greater detail later. This can be especially necessary when the electric drive or the associated signal generator fails.

Figure 2:
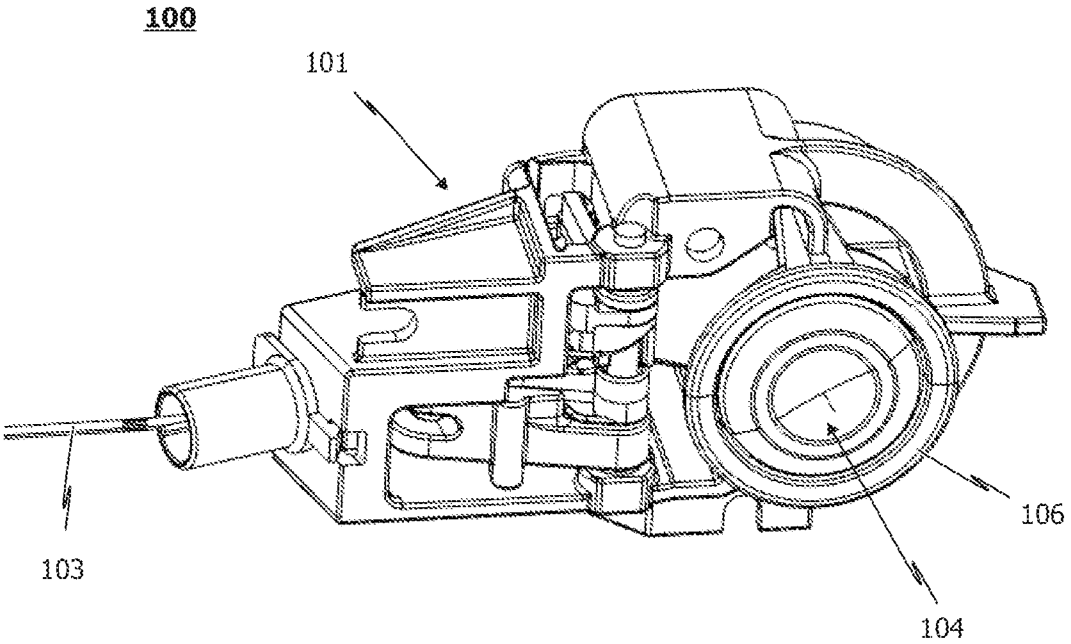
FIG. 2 is a schematic perspective view of an actuating mechanism according to an embodiment of the present disclosure.

FIG. 2 provides a schematic perspective view of an actuating mechanism according to an embodiment of the present disclosure. The actuating mechanism 100 comprises an actuating means 104 already shown in FIG. 1. It comprises a grip region configured as a push-button. The actuating means 104 is received in an aperture 106, which can be configured so as to cover an opening in the interior skin of the vehicle interior. The aperture 106 is substantially cylindrical.

The actuating mechanism 100 comprises a housing 101, which, in the installed state, is arranged within the vehicle door. For example, as shown in FIG. 1, only portions of the actuating means 104 and the aperture 106 are visible on the interior skin of the vehicle door.

The housing 101 is connected to a door latch via a Bowden cable 103 in order to enable a mechanical unlocking, as will be explained in greater detail later on.

Figure 3A:
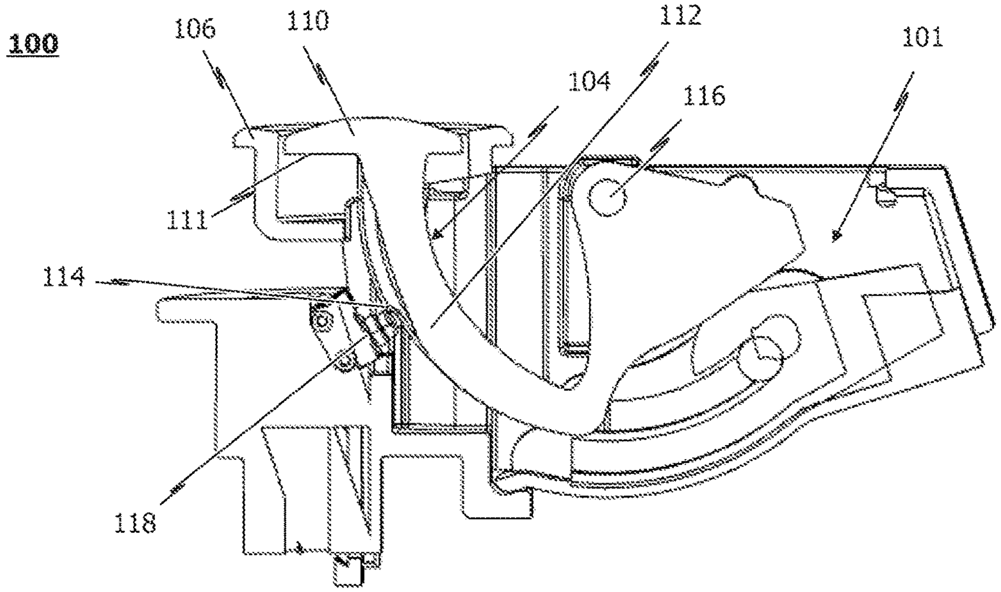
FIG. 3A is a cross-section through the actuating mechanism according to FIG. 2 in a home position of the actuating means.
Figure 3B:
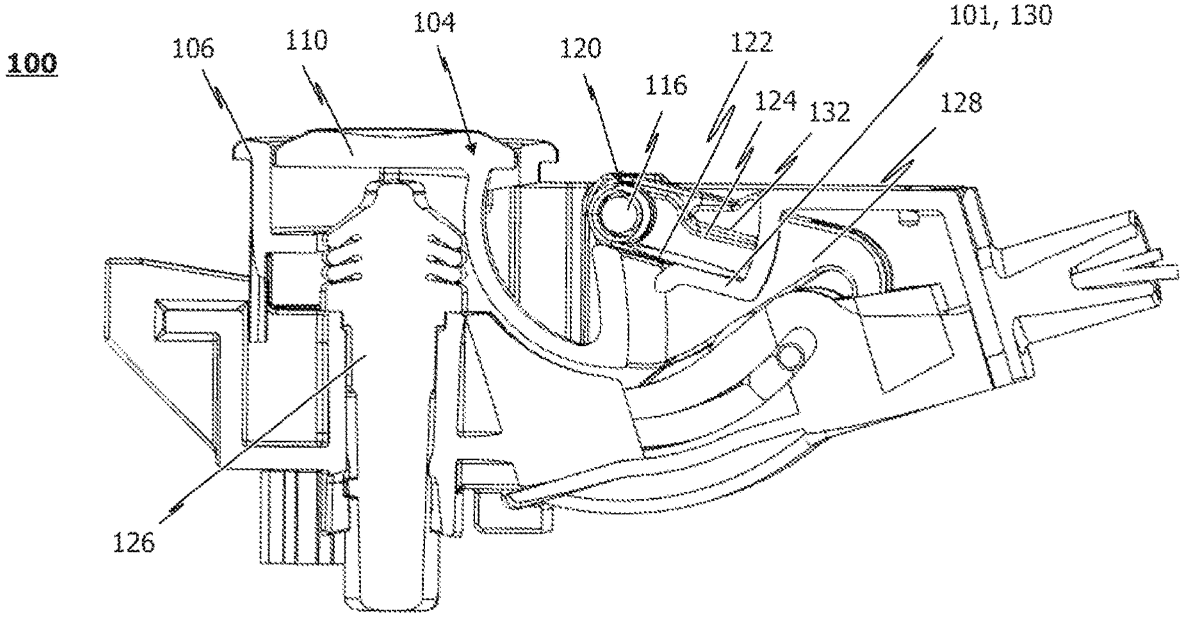
FIG. 3B is a cross-section through the actuating mechanism according to FIG. 2 in a home position of the actuating means.
Figure 3C:
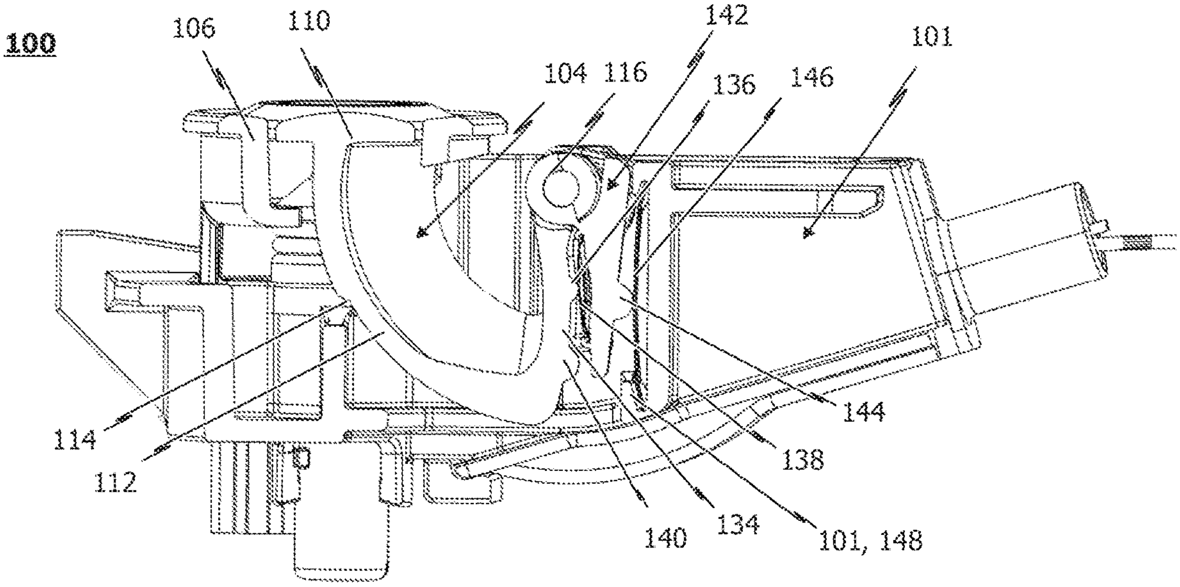
FIG. 3C is a cross-section through the actuating mechanism according to FIG. 2 in a home position of the actuating means.

FIGS. 3A to 3C show different cross-sections through the actuating mechanism 100 shown in FIG. 2 in a home position of the actuating means 104. The home position also corresponds to the position shown in FIG. 2. In this home position, a grip region 110 of the actuating means 104 is in particular flush with an outside of the aperture 106. In the home position shown here, neither an electrical signal for unlocking nor a manual unlocking is enabled by the actuating mechanism. The actuating means 104 is in particular biased to the home position shown in FIGS. 3A to 3C.

FIG. 3A shows a first cross-section through the actuating mechanism 100. The actuating means 104 comprises a grip region 110, which functions as a push-button on the one hand and as a pull-grip on the other hand for the user. The grip region 110 is movable relative to the aperture 106. To this end, the actuating means 104 is connected to a pivot axis 116. The pivot axis 116 is fixedly connected to the housing 101 of the actuating mechanism 100.

The actuating means 104 has a curved region 112 arranged between the grip region 110 and the pivot axis 116. The grip region covers the curved region 112 and is oriented substantially perpendicular to the curved region 112. The grip region 110 protrudes beyond an edge of the curved region 112 and thus forms an engagement on its underside 111, which allows the user to pull the actuating means 104 out of the housing 101 for the emergency release.

The curved region 112 has at least two different radii. In particular, the curved region 112 has a larger radius at a first end connected to the grip region 110 than at a second end connected to the pivot axis 116. A ramp 114 is provided between the first and second ends of the curved region 112. The ramp 114 is a transfer between the aforementioned different radii.

The actuating mechanism 100 comprises a signal transmitter, which is provided herein as a microswitch 118. The microswitch 118 is a button that is in contact with the surface of the curved region 112 of the actuating means 104. In the home position of the actuating means 104 shown in FIGS. 3A to 3C, the button is in particular connected to the second end of the curved region 112, which has the smaller radius. The actuating mechanism 100 is configured such that the microswitch 118 is not activated in this position. In other words, the button is not actuated by the curved region 112 in the home position of the actuating means 104.

FIG. 3B shows a further cross-section through the actuating mechanism 100 according to FIG. 2. Compared to FIG. 3A, the cross-section of FIG. 3B extends in a plane protruding further out from the drawing plane in FIG. 3A. In other words, the microswitch 118 of FIG. 3A is located behind the plane illustrated in FIG. 3B.

Figure 6A:
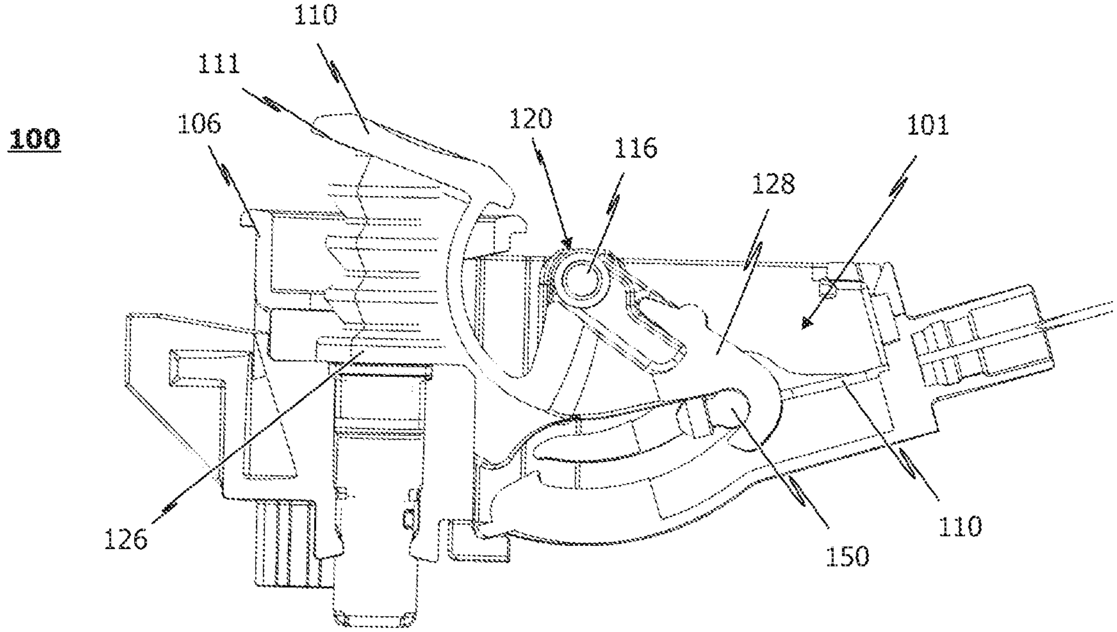
FIG. 6A is a cross-section through the actuating mechanism according to FIG. 2 in the second actuating position of the actuating means.
Figure 6B:
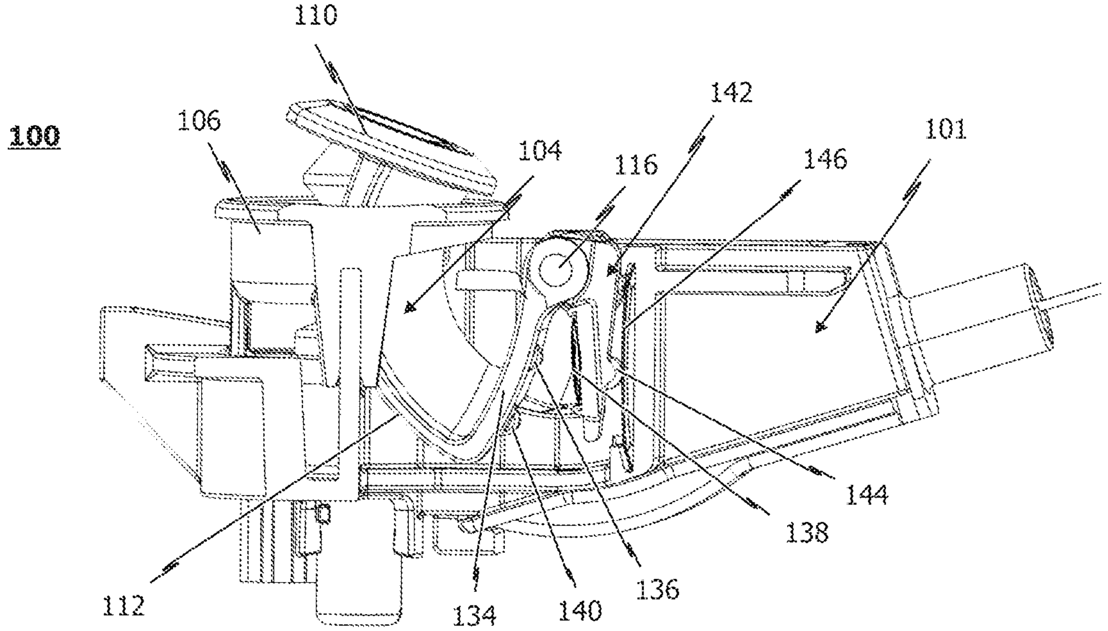
FIG. 6B is a cross-section through the actuating mechanism according to FIG. 2 in the second actuating position of the actuating means.
Figure 6C:
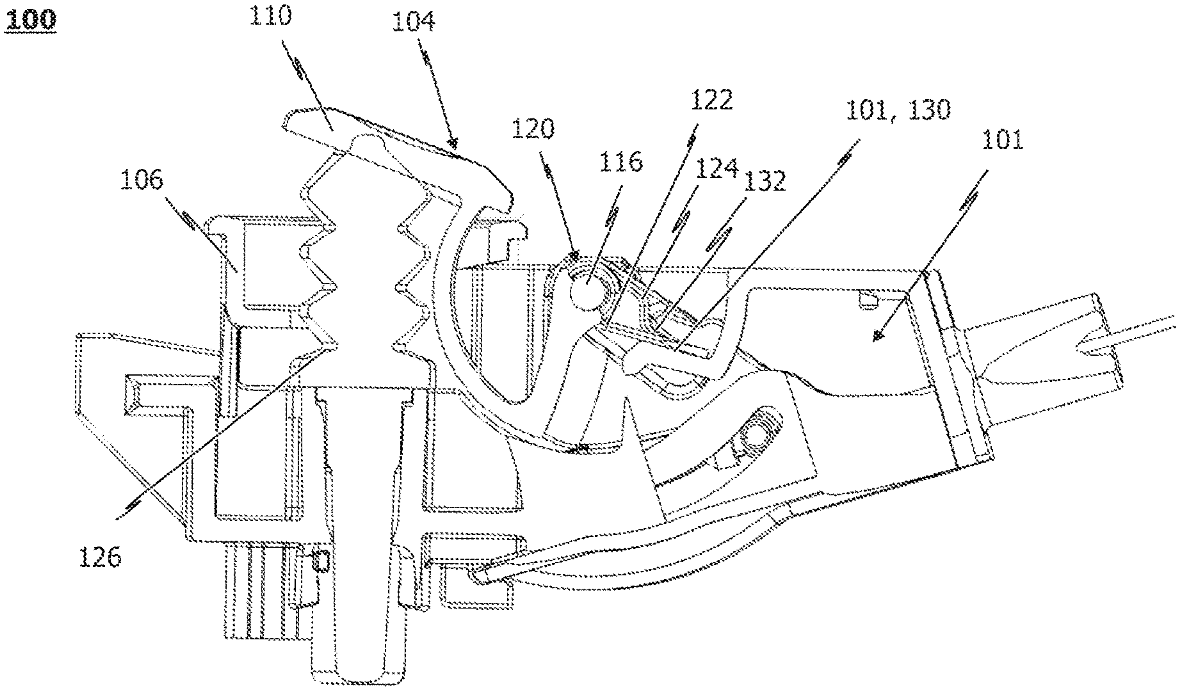
FIG. 6C is a cross-section through the actuating mechanism according to FIG. 2 in the second actuating position of the actuating means.

The actuating mechanism 100 comprises a push-push element 126, which is configured in order to transfer the actuating means into its second actuating position (FIG. 6C).

In the sectional plane illustrated in FIG. 3B, a torsion spring 120 of the actuating mechanism 100 is further shown. The torsion spring 120 is supported on the pivot axis 116. A first end 122 of the torsion spring 120 is supported on a stop surface 130 of the housing 101. A second end 124 of the torsion spring 120 is supported on a stop region 132 of the actuating means 104. The torsion spring 120 is in particular used in order to return the actuating means 104 from its second actuating position into the home position.

The actuating means 104 comprises an emergency release element 128, which is shown here as a hook, which is configured so as to grasp a pulling head (150, FIG. 7A) of a Bowden cable for emergency release.

FIG. 3C shows a further cross-section through the actuating mechanism 100 shown in FIG. 2. The sectional plane according to FIG. 3C lies in front of the sectional plane of FIGS. 3A and 3B. In other words, the sectional planes in FIGS. 3A and 3B are behind the sectional plane according to FIG. 3C.

The sectional plane according to FIG. 3C also shows the curved region 112 and the ramp 114 of the actuating means 104. The curved region 112 is connected at its first end to the grip region 110 of the actuating means 104. At an opposite second end of the curved region 112, the actuating means 104 comprises an actuating region 134. The actuating region 134 is in particular pivotally connected to the pivot axis 116. The actuating region 134 together with the curved region 112 forms a U-shape with a curved leg and a substantially straight leg. Overall, the actuating means 104 comprises a substantially trumpet-like cross-section.

The actuating mechanism 100 comprises a first flat spring 138 and a second flat spring 146. The two flat springs 138, 146 bias the actuating means 104 into its home position shown in FIGS. 3A to 3C.

In the home position of the actuating means 104, the actuating region 134 abuts the first flat spring 138. In particular, the actuating region 134 does not deform the first flat spring 138 in the home position of the actuating means 104. The actuating region 134 has a first protrusion 136 extending from the actuating region 134 towards the first flat spring 138. Accordingly, in particular the first protrusion 136 of the first actuating region 134 abuts the first flat spring 138 in the home position of the actuating means 104.

The actuating mechanism 100 comprises a pivot arm 142 connected to the pivot axis 116. The first flat spring 138 is attached to the first pivot arm 142. In other words, the pivot arm 142 is a pivotable support assembly for the first flat spring 138. The first pivot arm 142 is movable relative to the housing 101 as well as the actuating means 104. In particular, the pivot arm 142 is pivotable about the pivot axis 116.

In the home position shown in FIG. 3C, the first pivot arm 142 lies on the second flat spring 146. In particular, the pivot arm 142 has a second protrusion 144 that abuts the second flat spring 146 without deforming the second flat spring 146.

The second flat spring 146 is arranged directly on the housing 101. For this purpose, the housing 101 comprises the fastening region 148 shown in FIG. 3C.

The first and second flat springs according to the embodiment shown in FIG. 2 have different resetting forces. Specifically, the second flat spring 146 is a stronger spring than the first flat spring 138. For example, the second flat spring 146 can be thicker than the first flat spring 138. According to one design variant, the second flat spring 146 can consist of, for example, two or more leaf springs that are connected flush with one another.

However, it is not necessarily required for the two flat springs 138, 146 to have different resetting forces. Rather, it is of importance that the two flat springs are deformed at different points in time. In the illustrated embodiment, in particular, the first flat spring 138 is to be deformed first, before the second flat spring 146 is deformed. In order to achieve deformation of the two flat springs 138, 146 at different times, it must only be guaranteed, in particular, that the first flat spring 138 already deforms with a smaller force input than the second flat spring 146. To this end, it can also be provided, as an alternative to different resetting forces, that a lever length of the actuating region 134 is longer than a lever length of the pivot axis 142.

Figure 4A:
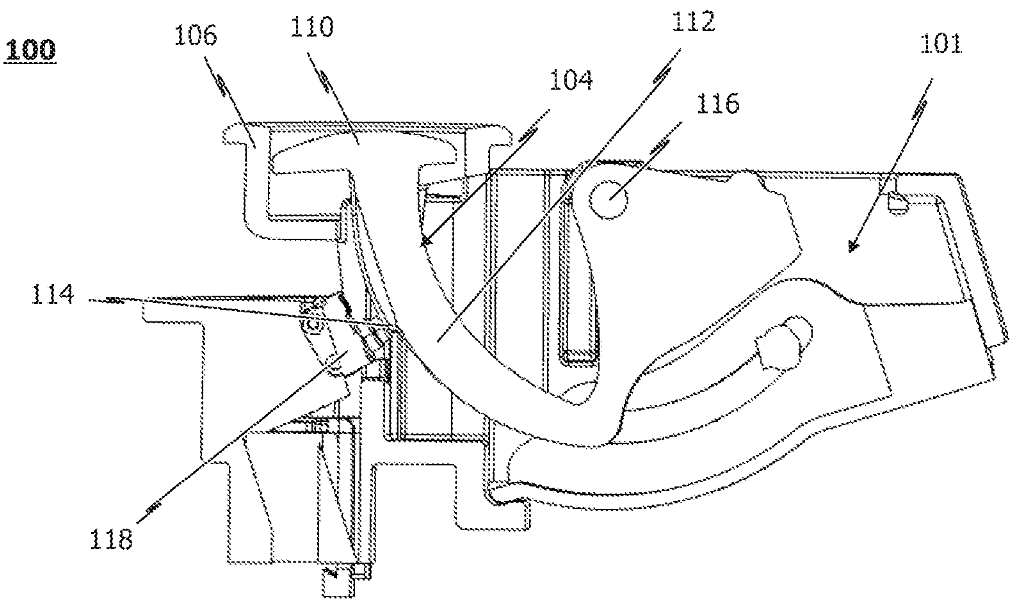
FIG. 4A is a cross-section through the actuating mechanism according to FIG. 2 in a first actuating position of the actuating means.
Figure 4B:
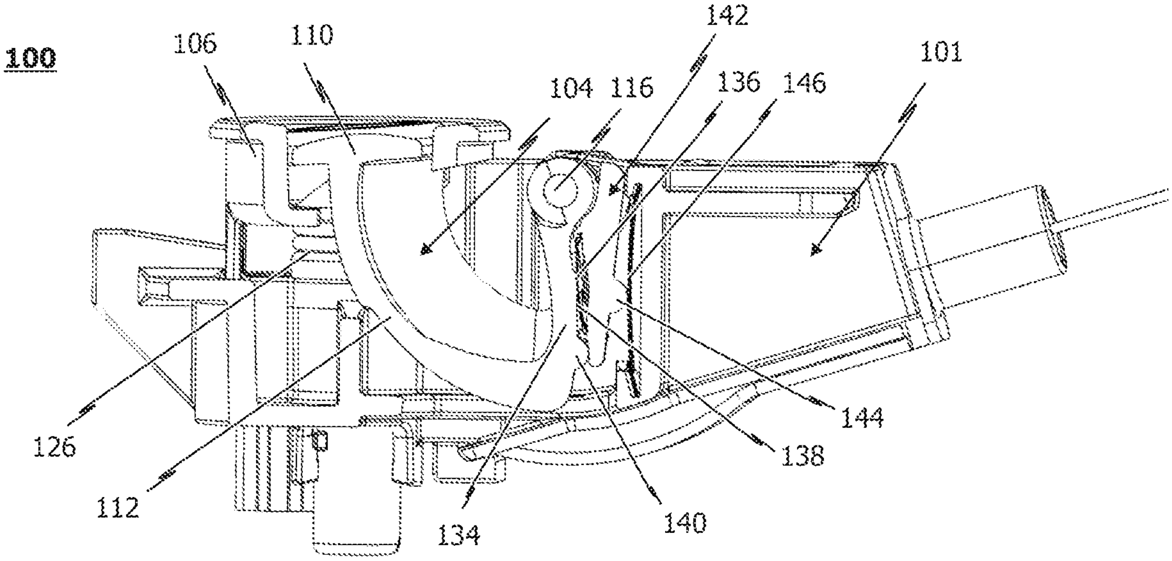
FIG. 4B is a cross-section through the actuating mechanism according to FIG. 2 in a first actuating position of the actuating means.

FIGS. 4A and 4B show the actuating mechanism 100 in the first actuating position of the actuating means 104. The sectional axis according to FIG. 4A corresponds to the sectional axis according to FIG. 3A. Here, the sectional axis according to FIG. 4B corresponds to the sectional axis according to FIG. 3C.

In the first actuating position of the actuating means 104, it is pivoted inwardly (that is, towards the vehicle door). FIG. 4A accordingly shows that the grip region 110 is no longer arranged flush with the top end of the aperture 106 but rather has been pushed into the aperture 106. The user's pressing of the grip region 110 causes in particular a pivoting of the actuating means 104 about the pivot axis 116, opposite the microswitch 118.

In the first actuating position, the actuating means 104 has been pivoted with respect to the microswitch 118 such that the ramp region 114 is driven over the button of the microswitch 118, so that it is pushed in due to the larger radius of the curved region 112. Thus, in the first actuating position of the actuating means 104, the microswitch 118 is switched in order to generate a signal to activate an electric drive. In other words, the actuating mechanism 100 is configured in order to generate an electrical actuation signal in the first actuating position. In FIG. 4B, it can also be seen that the push-push element 126 is not activated in the first actuating position. In other words, the actuating means 104 is not yet in contact with the push-push element 126 in the first actuating position.

FIG. 4B shows that the first flat spring 136 has been deformed in the first actuating position of the actuating means 104. In other words, the actuating region 134 of the actuating means 104 has been moved opposite the pivot arm 142, contrary to the resetting force of the first flat spring 138. This has resulted in a deformation of the first flat spring 138 by the first protrusion 136. The second flat spring 146 is not deformed in the first actuating position and is thus in a resting position. In other words, the second flat spring 146 provides a stop for the first flat spring, in particular for the pivot arm 142 of the first flat spring 138 when the actuating means 104 is transferred into the first actuating position. In the illustrated embodiment, this is achieved in particular by a second flat spring 146 that is stronger than the first flat spring 138, i.e., having a higher spring constant.

The first flat spring and the second flat springs 138, 146 can be configured as snap springs (also known as snap frogs). Accordingly, the deformation of the flat springs 138, 146 provides a haptic as well as an acoustic feedback to the user. In the first actuating position according to FIGS. 4A and 4B, the user knows from the acoustic and haptic feedback of the first flat spring 138 configured as a snap spring that the first actuating position has been reached and that a signal has been generated by the microswitch 118.

The deformation of the first spring element 138 is limited by a stop 140 of the actuating region 134. The stop 140 abuts the pivot arm 142 in the first actuating position of the actuating means 104. Thus, the relative movement between the actuating means 104 and the pivot arm 142 is limited. A further pivoting of the actuating means 104 towards the flat springs 138, 146 is transferred directly to the pivot arm 142 and thus to the second flat spring 146 from the first actuating position. In other words, the pivot arm 142 is pivoted together with the actuating means 104 should the user continue to push in the actuating means 104 even after the snapping by the first flat spring 138.

In normal operation, the user will release the grip region 110 upon reaching the first actuating position such that the first flat spring 138 snaps back and the actuating means reverts back to its home position. Thus, the biasing force of the first flat spring 138 is used in order to pivot the actuating means 104 clockwise back into its home position.

Figure 5A:
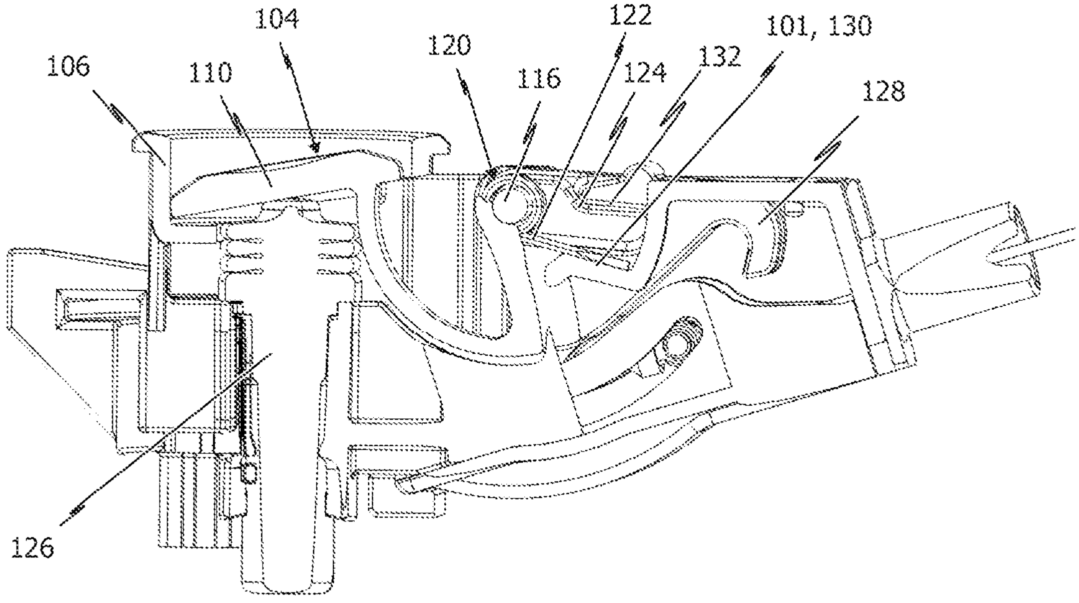
FIG. 5A is a cross-section through the actuating mechanism according to FIG. 2 upon actuation of the push-push element.
Figure 5B:
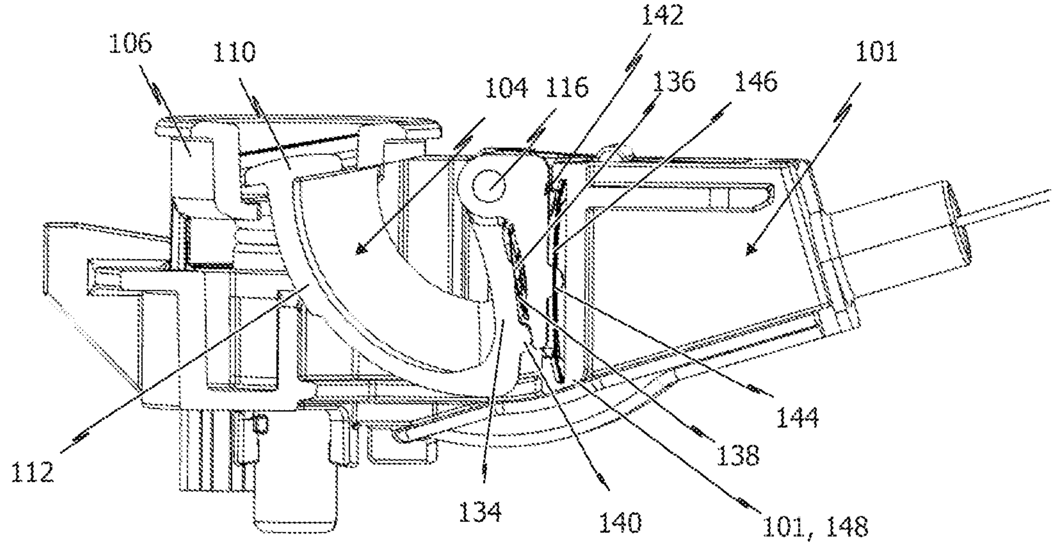
FIG. 5B is a cross-section through the actuating mechanism according to FIG. 2 upon actuation of the push-push element.

FIGS. 5A and 5B show cross-sections through the embodiment according to FIG. 2, showing an intermediate position of the actuating means 104. In the intermediate position, the actuating means 104 lies between the first actuating position and the second actuating position. The sectional plane in FIG. 5A corresponds in particular to the sectional plane according to FIG. 3B. The sectional plane in FIG. 5B corresponds to the sectional plane according to FIG. 3C.

The intermediate position shown in FIGS. 5A and 5B serves to activate the push-push element 126 in order to transfer the actuating means 104 into its second actuating position (FIGS. 6A to 6C). Compared to the first actuating position shown in FIGS. 4A and 4B, the actuating means 104 is further pushed in in the intermediate position shown. In other words, the actuating means 104 is pivoted counterclockwise in the intermediate position further than was the case in the first actuating position. This further pivoting of the actuating means 104 clockwise is in particular facilitated by a deformation of the second flat spring 146.

FIG. 5A shows that the grip region 110 of the actuating means 104 in the intermediate position has been pushed into the housing 101, in particular into the aperture 106, far enough that the result is an activation (compression) of the push-push element 126. In the context of FIG. 5A, it is further mentioned that the pushing in of the actuating means 104 occurs in principle with the biasing direction of the torsion spring 120. In other words, the pivoting of the actuating means 104 counterclockwise does not occur against but rather with the biasing of the torsion spring 120. The torsion spring 120 is thus not biased further by the pressing in of the actuating means 104 shown in FIGS. 4A to 5B.

FIG. 5B shows that both flat springs 138, 146 are deformed in the intermediate position. The deformation is shown only schematically. In particular, it appears in the figures that the protrusions 136, 144 penetrate the flat springs 138, 146. Of course, this is not the case. Rather, the flat springs 138, 146 are deformed by the protrusions 136, 144.

By displacing the actuating means from the first actuating position into the intermediate position shown in FIGS. 5A and 5B, the pivot arm 142 moves along with the actuating region 134 towards the second flat spring 146 and deforms it accordingly. In the intermediate position shown in the figures, the fastening region 148 of the housing 101, which receives the second flat spring 146, serves as the end stop.

In particular, in this state, the second protrusion 144 of the pivot arm 142 abuts a back wall of the fastening region 148. Thus, a further pivoting into the interior of the housing 101 is no longer possible.

By deforming the second flat spring 146, an acoustic and haptic feedback is generated, which confirms to the user that this intermediate position has been achieved, i.e., that the push-push element 126 has been sufficiently pressed in order to activate it.

Figure 7A:
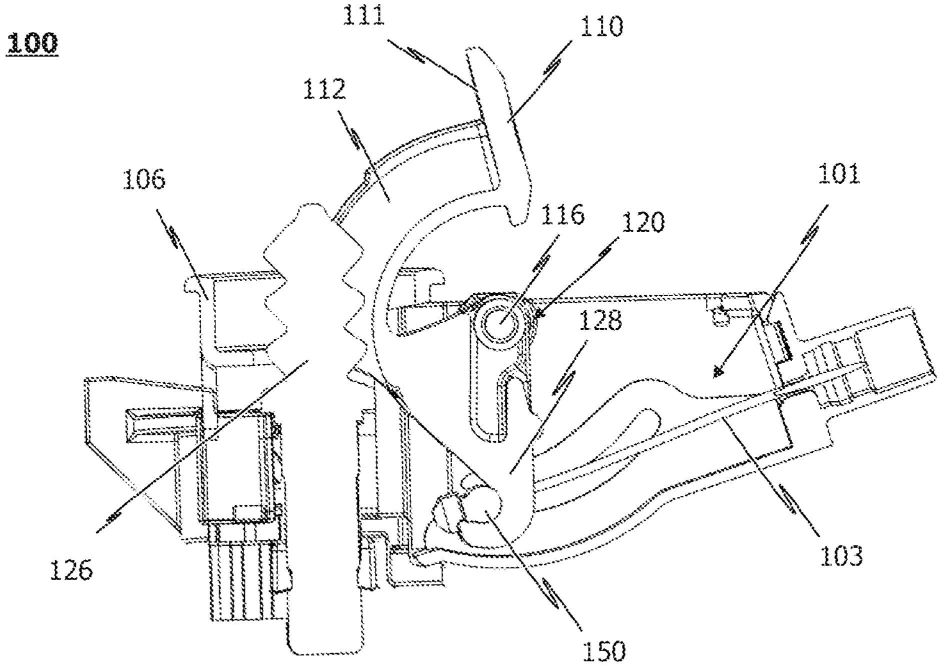
FIG. 7A is a cross-section through the actuating mechanism according to FIG. 2 upon activation of the emergency release.
Figure 7B:
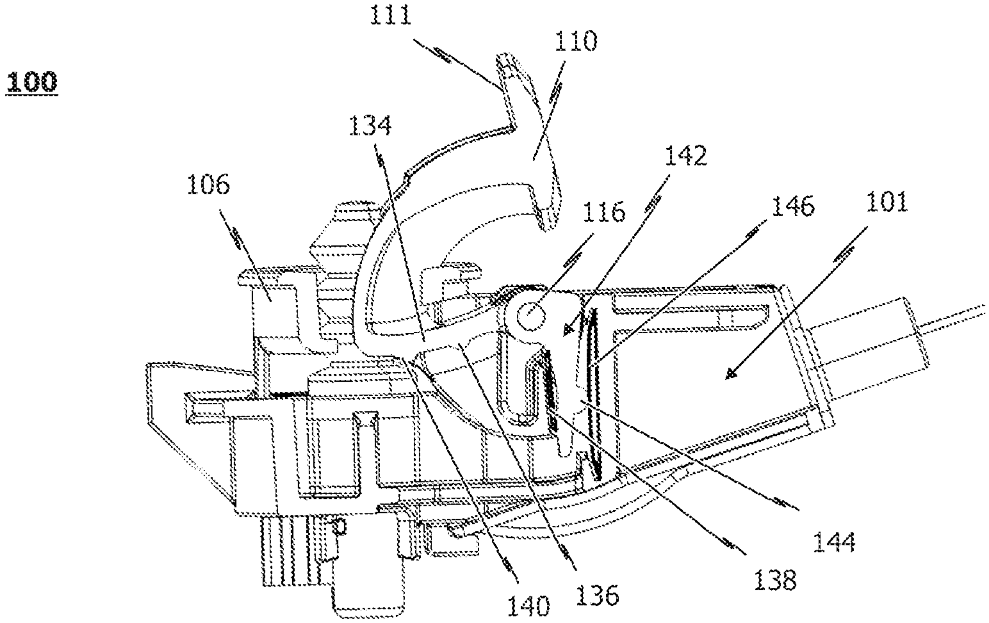
FIG. 7B is a cross-section through the actuating mechanism according to FIG. 2 upon activation of the emergency release.

The activation of the push-push element 126 results in the actuating means 104 being transferred into its second actuating position, which is shown in FIGS. 6A to 6C. In the second actuating position, the actuating means 104 is pushed out of the housing 101, in particular out of the aperture 106, by the push-push element 126. In other words, in the second actuating position, the grip region 110 of the actuating means 104 protrudes from the housing, in particular via the aperture 106, such that the actuating means 104 can be grasped and pulled out of the housing 101 (FIGS. 7A and 7B). For example, the actuating means 104 is pushed out of the aperture 106 through the push-push element 126 far enough for a user to grasp behind the grip region 110 in order to pull the actuating means 104 out of the housing 101.

FIG. 6A shows that, when the actuating means 104 is pivoted by expelling the push-push element 126, the actuating means is pivoted in the clockwise direction. In other words, in order to transfer the actuating means 104 into its second actuating position, it is pivoted in a direction opposite to the first actuating position. By pivoting the actuating means 104 clockwise, the emergency release element 128 formed as a hook comes into contact with a pulling head 150 of the Bowden cable 103. In this second actuating position, the emergency release member 128 is operatively engaged with the Bowden cable 103. However, at this point in time, an actuation of the Bowden cable 103 does not yet occur. This is achieved, as shown in FIGS. 7A and 7B, only by a further retraction of the actuating means from the housing 101 by the user.

FIG. 6B shows that the two flat springs 138, 146 are back in their home position in the second actuating position of the actuating means 104. In other words, in the second actuating position of the actuating means 104, the flat springs 138, 146 are not deformed. The pivot arm 142 is substantially identically aligned in the second actuating position of the actuating means 104 as is the case in the home position. Only the actuating region 134 of the actuating means 104 is now distanced from the first flat spring 138.

From FIG. 6C, it can be seen that the expulsion of the grip region 110 by the push-push element 126 occurs counter to the biasing of the torsion spring 120. In particular, a pivoting of the actuating means 104 in the clockwise direction causes the second end 124 of the torsion spring 120 to twist relative to the first end 122. The first end 122 remains in its initial position. A tensioning of the torsion spring 120 occurs, which counteracts the expulsion of the grip region 110. The torsion spring 120 thus serves to return the actuating means 104 into its home position shown in FIGS. 2 to 3C. However, in the second actuating position according to FIGS. 6A to 6C, the resetting is prevented by the activated push-push element 126. Accordingly, a resetting of the actuating means 104 is only possible when the push-push element 126 is returned to its initial position. The biasing force of the torsion spring 120 facilitates the push-push element 126 to be pushed back accordingly.

Figure 7C:
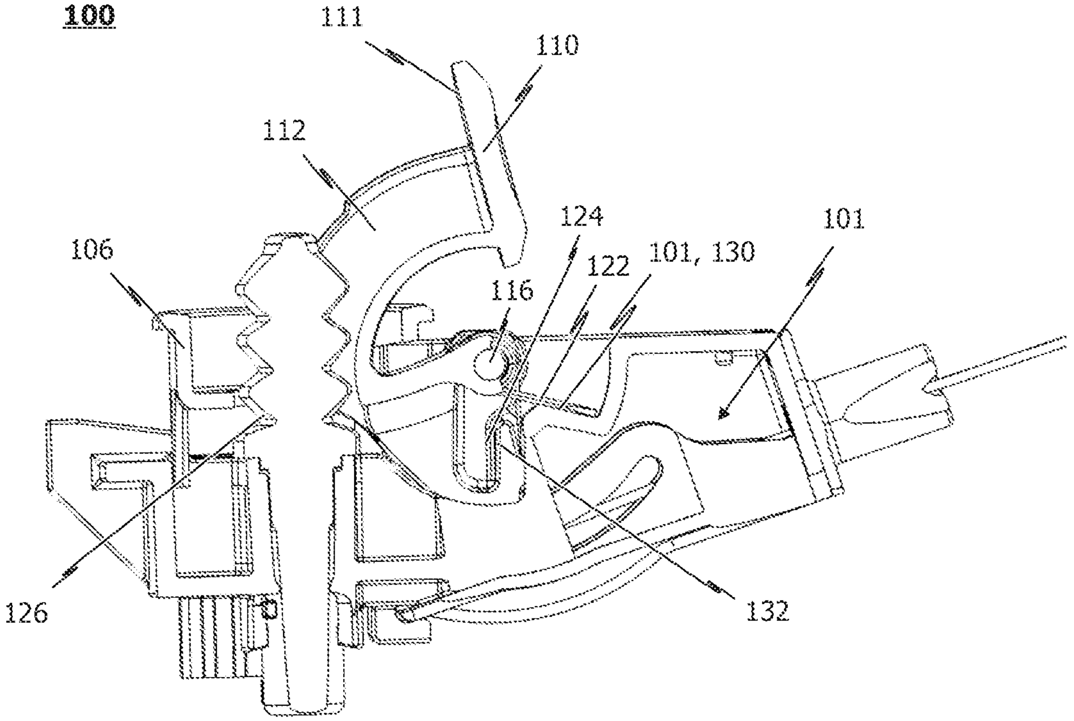
FIG. 7C is a cross-section through the actuating mechanism according to FIG. 2 upon activation of the emergency release.

FIGS. 7A to 7C show an emergency release operation. As in the context of FIG. 6A, the emergency release element 128 of the actuating means 104 is already operatively engaged with the pulling head 150 of the Bowden cable 103 in the second actuating position (FIG. 6A). A further pivoting of the actuating means 104 clockwise (for example, through a pulling by the user) results in a pulling force being applied to the Bowden cable 103 by the emergency release element 128. As a result, a mechanical unlocking of the vehicle door can occur.

From FIG. 7B, it can be seen that the two flat springs 138, 146 remain in their initial position (that is, not deformed) even when the emergency release is actuated. Thus, the pivot arm 142 is in its initial position when the emergency release is actuated.

As illustrated in FIG. 7C, the emergency release is also performed counter to the biasing of the torsion spring 120. Thus, the second end 122 of the torsion spring 120 is rotated even further opposite the fixed, first end 122 of the torsion spring 120 by the emergency release. Thus, the torsion spring 120 continues to attempt to transfer the actuating means 104 back into its home position.

The present disclosure is not limited to the embodiment shown in the figures. Rather, it results from a summary of all the features shown in the figures.

What is claimed is:

1. A mechanism for actuating a vehicle door, the mechanism comprising:
   an actuating element, wherein the actuating element is configured to move from a home position into a first actuating position configured to engage a switch to generate an electrical actuation signal and into a second actuating position configured for manual actuation of the vehicle door by a user;
   a first flat spring connected to the actuating element and configured as a snap spring to provide tactile or acoustic feedback to confirm to the user when the actuating element is transferred into the first actuating position, wherein the first flat spring is configured to bias the actuating element into the home position; and
   a second flat spring connected to the actuating element and configured to bias the actuating element toward the home position.

2. The mechanism according to claim 1,
   wherein the second flat spring is connected to the first flat spring and configured to position the first flat spring in a resting position by forming a stop for the first flat spring when the actuating element is transferred from the home position into the first actuating position, and wherein the second flat spring permits a further movement of the actuating element from the first actuating position into an intermediate position through deformation of the second flat spring.

3. The mechanism according to claim 2,
   wherein the second flat spring is connected to the actuating element and configured to bias the actuating element into the home position or generate haptic or acoustic feedback when the actuating element is transferred into the intermediate position.

4. The mechanism according claim 1,
   wherein the first flat spring and the second flat spring are arranged in series opposite the actuating element.

5. The mechanism according to claim 1,
   wherein the actuating element is configured such that a return force of the first flat spring must be overcome in order to transfer into the first actuating position and that a return force of the first flat spring and the second flat spring must be overcome in order to transfer into the second actuating position.

6. The mechanism according to claim 1,
wherein the actuating element are arranged in such a way with respect to the first spring and second spring that a higher force is required in order to transfer into the second actuating position than is required in order to transfer into the first actuating position.

7. The mechanism according to claim 1,
wherein the first flat spring has a lower return force than the second flat spring.

8. The mechanism according to claim 1,
wherein the second flat spring comprises leaf springs arranged side-by-side, or wherein the second flat spring comprises a flat spring that is stronger than the first flat spring.

9. The mechanism according to claim 1,
wherein the first flat spring or the second flat spring is formed as a buckling spring.

10. The mechanism according to claim 1,
further comprising a push-push element, which is configured in order to transfer actuating element into the second actuating position.

11. The mechanism according to claim 10,
wherein the push-push element is arranged in such a way that the push-push element is activated after a deformation of the second flat spring.

12. The mechanism according to claim 1,
wherein the actuating element is pivotally fastened to a pivot axis in such a way that the actuating element is movable relative to the first flat spring.

13. The mechanism according to claim 12,
wherein the first flat spring is fastened to a pivot arm that is pivotally fastened to the pivot axis.

14. The mechanism according to claim 13,
wherein, in the home position and in the first actuating position of the actuating element, the pivot arm abuts the second flat spring without deforming the second flat spring.

15. A vehicle having the mechanism according to claim 1.

16. The mechanism according to claim 2,
wherein the second flat spring is configured to hold the first flat spring in the resting position.

17. The mechanism according to claim 2,
wherein movement of the actuating element from the first actuating position into the intermediate position activates a mechanism that transfers the actuating element into the second actuating position.

18. A mechanism for actuating a vehicle door, the mechanism comprising:
an actuating element configured to move from a home position into one of a first actuating position to engage a switch to generate an electrical actuation signal and a second actuating position configured for manual actuation of the vehicle door by a user;
a first spring connected to the actuating element and configured as a snap spring to provide tactile or acoustic feedback to the user when the actuating element is transferred into the first actuating position, wherein the first spring is configured to bias the actuating element into the home position; and
a second spring connected to the actuating element, wherein the first spring and the second spring are arranged in series opposite the actuating element.

19. The mechanism according to claim 18,
wherein the second spring is connected to the first spring and configured to position the first spring in a resting position by forming a stop for the first spring when the actuating element is transferred from the home position into the first actuating position, and wherein the second spring permits a further movement of the actuating element from the first actuating position into an intermediate position through deformation of the second spring.

20. The mechanism according to claim 19,
wherein the second spring is configured to hold the first spring in the resting position.

* * * * *